Jan. 26, 1926.

R. HUMPHREYS

CAKE DROPPING MACHINE

Filed Feb. 14, 1925

Robert Humphreys
INVENTOR

BY Victor J. Evans
ATTORNEY

Jan. 26, 1926.  1,571,121
R. HUMPHREYS
CAKE DROPPING MACHINE
Filed Feb. 14, 1925  2 Sheets-Sheet 2
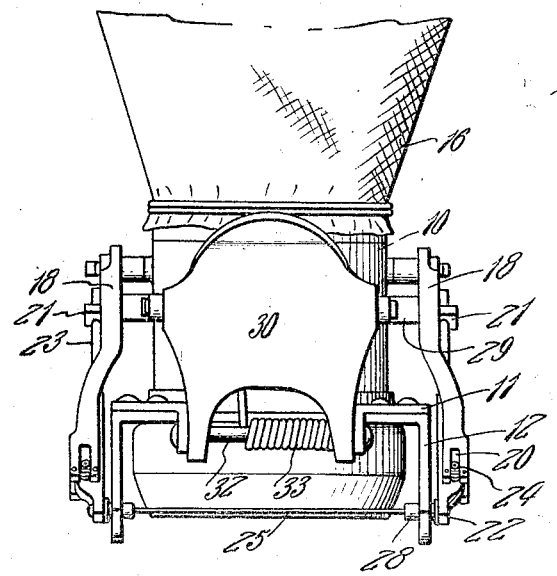
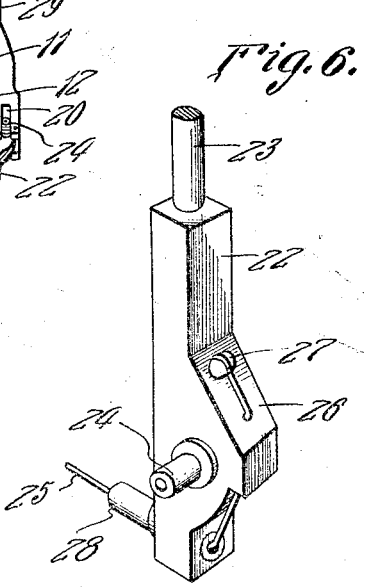
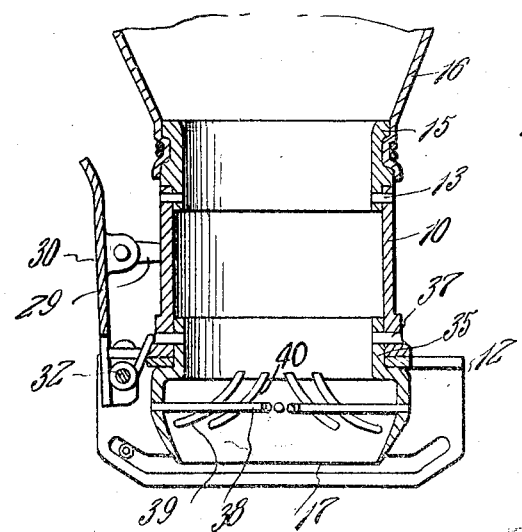
Robert Humphreys
INVENTOR
BY Victor J. Evans
ATTORNEY Patented Jan. 26, 1926.

1,571,121

UNITED STATES PATENT OFFICE.

ROBERT HUMPHREYS, OF SAN FRANCISCO, CALIFORNIA.

CAKE-DROPPING MACHINE.

Application filed February 14, 1925. Serial No. 9,201.

*To all whom it may concern:*

Be it known that I, ROBERT HUMPHREYS, a citizen of the United Kingdom of England, residing at San Francisco, in the county of San Francisco and State of California, have invented new and useful Improvements in Cake-Dropping Machines, of which the following is a specification.

This invention relates to cake dropping machines and comprehends certain improvements over Patent #1,151,465, issued to me August 24, 1915.

One of the chief characteristics of the present invention resides in the improved method of operating the cutting element, which can be easily and conveniently accomplished by the thumb of the operator.

In carrying out the invention, I also contemplate the provision of means whereby the cake or piece of material of larger diameter than the diameter of the body portion can be dropped from the machine, with said means preventing the dough or material from sticking to the body portion.

Another object of importance resides in the provision of a construction which permits the machine to be rocked forwardly after the cutting of the cake or material thus leaving the cutting element clear of the piece deposited.

The nature and advantages of the invention will be better understood when the following detailed description is read in connection with the accompanying drawings, the invention residing in the construction, combination and arrangement of parts as claimed.

In the drawings forming part of this application, like numerals of reference indicate similar parts in the several views, and wherein:

Figure 2 is a view taken at a right angle thereto.

Figure 3 is a vertical sectional view.

Figure 6 is a fragmentary perspective view of the cutter.

Figure 1:
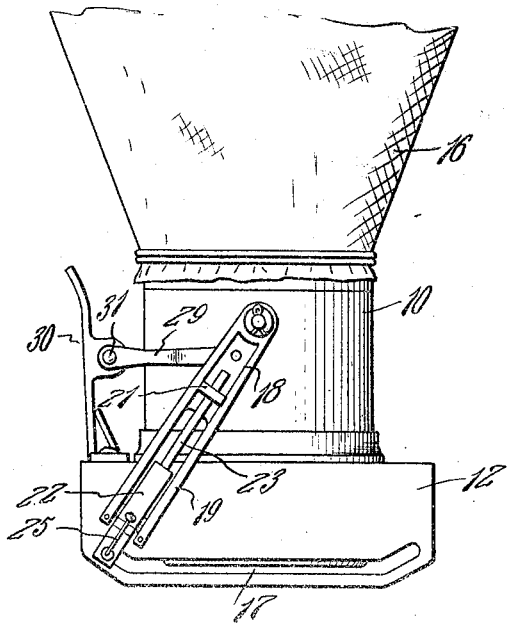
Figure 1 is a side elevation of the machine.

The machine forming the subject matter of the present invention comprises a body portion 10 of cylindrical formation which is of uniform diameter throughout its length and formed at its lower end with a flange 11 which is bolted or otherwise suitably secured to the base of the machine which includes spaced parallel flanges 12, the lower edges of which are substantially rocker shaped to allow the machine to be tilted forwardly after cutting the cake or other material thus leaving the cutting element clear of pieces deposited. The body portion 10 is provided with pins 13 which project inwardly from the body portion at diametrically opposite points, and which pins are adapted to be received by bayonet slots 14 formed in a ring or annulus 15 clamped within the mouth of the flexible hopper shaped sack or bag 16. Each flange 12 is formed with a longitudinal slot 17, the ends of which are extended upwardly as clearly shown in Figure 3, and the cutting element to be hereinafter described operates within the slots.

Pivoted upon the body portion 10 at diametrically opposite points are arms 18, and which arms are preferably of the construction shown in Figures 1 and 2. In other words, each arm is bifurcated at its lower end, and the separated portions 19 defined by said bifurcations are formed with slots 20. Projecting outwardly from each arm is an apertured lug 21. Arranged to operate within the bifurcated portion of each arm is a slide 22 of the construction clearly shown in Figure 6. Rising from this slide is a rod 23 which passes through the apertured lugs 21 to guide the slide in its movements. Projecting from the opposite sides of each slide 22 are rollers 24, and these rollers operate in the slots 20 of the adjacent arm 18. The slides 22 of the respective arms support the cutting element 25, which element is in the nature of a length of wire, the ends of which are passed through the openings in the lower ends of the slides 22, thence upwardly through a passage in the enlarged portion 26, and ultimately secured to the slide by means of a fastening element 27. The cutting element 25 supports rollers 28 which rollers are arranged to operate within the slots 17 of the flanges 12. The cutting element is moved across the bottom of the machine to sever the material forced therethrough, when the arms 18 are swung upon their pivots from the position shown in Figure 1 toward the other end of the slots 17. For operating the arms 18 in this manner I employ a yoke, the parallel sides of which are indicated at 29 and arranged at the opposite sides of the body portion 10. These parallel sides of the yoke are pivotally connected with the arms 18, while the intermediate portion of the yoke consists of a thumb plate 30 through which the adjacent ends of the sides 29 are pivotally connected as at 31. This thumb plate 30 may vary in size and configuration without departing from the spirit of the invention, but the plate however, is pivotally mounted upon a stationary shaft 32 and normally held spaced from the body portion 10 through the instrumentality of a coiled spring 33 coiled about said shaft and having one end bearing against the plate 30 for the purpose mentioned. This shaft 32 is supported by the base of the machine adjacent the lower end of the thumb plate 30 as clearly illustrated in Figures 2 and 3. By reason of this construction, it is manifest that the plate 30 can be conveniently and easily operated by the thumb of the user, and when said plate is moved in the direction of the body portion 10, pivotal movement is imparted to the arms 18, thus moving the cutting element 25 through the slots 17 of the flanges 12 and cutting the material fed through the machine as described. The cutting element 25 being carried by the slides 22 is permitted a slight vertical adjustment, so as to ride along the upper edges of the slots 17 and lie close to the lower end of the machine as will be understood. After the thumb plate is released, the spring 33 functions to return the said plate as well as the cutter and arms 18 to their normal positions.

Figure 7:
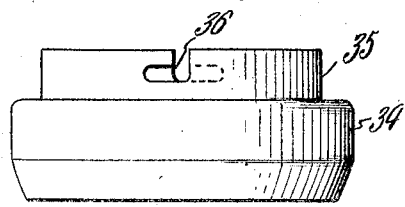
Figure 7 is an edge elevation of the die shown in Figure 4.
Figure 4:
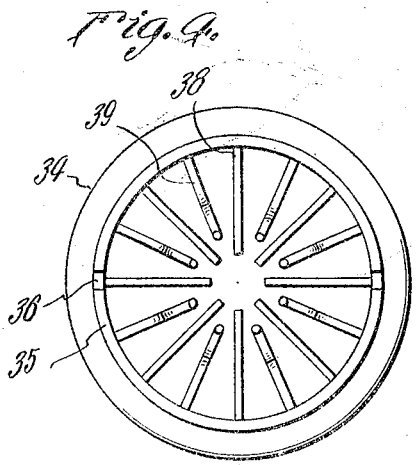
Figure 4 is a plan view of the die.
Figure 5:
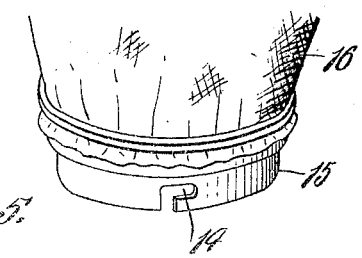
Figure 5 is a fragmentary view of the canvas bag.

Connected to and depending from the lower end of the body portion 10 is a die such as illustrated in Figures 4 and 7, the die including a body portion 34 of slightly larger diameter than the diameter of said body portion 10. Rising from this body portion is an annular flange 35 adapted to be positioned within the body portion 10, and which flange is formed with bayonet slots 36 to receive the pins 37 supported by the body portion 10. As illustrated in Figure 4, the body portion 34 of the die supports a radial series of wire elements, all of which project inwardly from the said portion 34 toward the center, and these elements alternately vary in length. In other words, each element 38 is slightly longer than the adjacent element 39, and the elements 38 and 39 are alternately arranged as shown in Figure 4. The elements 39 are curved upwardly as at 40, and extend within the flange 35, so that when the dough is forced through the machine it is engaged by the curved portions 40 of the element 39, and is thus slid or forced toward the wall of the larger portion 34 of the die with a view of cutting cake or pieces of material of a greater diameter than the diameter of the body portion 10. In addition to this use, the elements 39 together with the elements 38 serving to cut the dough at spaced points to prevent the latter from sticking to the wall of the die, and this is further effectuated by the cross sectional contour of the die itself. It might here be stated that I contemplate the use of a die of different contours which can be easily and quickly associated with the body portion 10 of the machine as the die herein shown. The different dies being used to make different articles such as a macaroon or the like, while other dies will be shaped to deposit more than one cake with each operation of the machine.

While it is believed that from the foregoing description, the nature and advantages of the invention will be readily apparent, I desire to have it understood that I do not limit myself to what is herein shown and described, and that such changes may be resorted to when desired as fall within the scope of what is claimed.

Having thus described the invention, I claim:

1. A machine of the character described comprising a base including opposed depending flanges, and a hollow body portion open at both ends, a hopper like bag attached to one end thereof, said flanges having aligned slots, arms pivoted on the opposite sides of said body portion, a cutting element associated with said arms and movable through said slots across the lower end of said body portion, and a yoke connected with said arms and including a thumb actuated plate normally held spaced from the body portion, and adapted to be actuated to move said arms and connecting element in one direction.

2. A machine of the character described comprising a base including spaced flanges, a hollow body portion open at both ends, said flanges having aligned slots with upwardly extended extremities, arms pivoted on the opposite sides of said body portion, a cutting element operating in said slots and adapted to be moved across the bottom of said body portion, means for associating said element with said arms and permitting said element a slight vertical movement to follow the contour of said slots, means including a thumb actuated plate for moving said arms and cutting element in one direction, and means for returning said parts to their normal positions when said plate is released.

3. A machine of the character described, comprising a base including spaced parallel flanges, said flanges having aligned slots, the ends of which extend upwardly, bifurcated arms pivoted on the opposed sides of said body portion, a cutting element operable within said slots and adapted to be moved across the lower end of said body portion, slides supporting said cutting element and associated with said arms to permit said element a slight vertical movement to follow the contour of said slot, rollers supported by the cutting element and arranged in said slot, and means including a spring pressed plate adapted to be actuated to move said arms and cutting element in one direction.

4. A machine of the character described comprising a base including spaced parallel flanges having slots, a hollow body portion open at both ends, a hopper like bag attached to one end thereof, bifurcated slotted arms pivoted on the opposed sides of said body portion, slides associated with said arms, rollers carried by each slide and arranged to operate in the slots of the adjacent arm, a cutting element supported by said slide, and capable of sliding vertical movement with said slides as said element is moved through the slots of said flanges, rollers carried by said cutting element and operating in said last-named slots, and means including a spring pressed pivoted plate adapted to be actuated to move the arms and said element in one direction.

5. A cake dropping machine of the character described comprising a base, a hollow body portion open at both ends and adapted to receive the material for said cakes, a cutting element mounted for movement across the lower end of the machine for cutting said material into cakes, means for operating said cutting element, a die supported by and depending from the lower end of the body portion and having a diameter slightly greater than the diameter of the latter, a plurality of wire elements projecting inwardly from the wall of said die and equidistantly spaced apart, and each alternate element being curved upwardly and arranged to spread said material to form a cake of greater size than the diameter of said body portion as described.

6. A cake dropping machine of the character described comprising a base, a hollow body portion supported thereon and open at both ends, said body portion being of uniform diameter throughout its length and adapted to receive the material for said cake, said base being slotted, a cutting element operating in said slots and adapted to be moved across the lower end of the machine to cut said material into cakes as the material is forced through the machine, means for operating said cutting element, a die detachably connected with the lower end of said body portion, and having a diameter greater than the diameter of the latter, and means arranged within the die for splitting the material as it leaves the body portion, the wall of said die being curved to prevent the material from sticking thereinto.

In testimony whereof I affix my signature.

ROBERT HUMPHREYS.